(12) United States Patent
Sullet et al.

(10) Patent No.: US 12,018,589 B2
(45) Date of Patent: Jun. 25, 2024

(54) BLADE MADE OF COMPOSITE MATERIAL COMPRISING A LEADING EDGE SHIELD, TURBINE ENGINE COMPRISING THE BLADE

(71) Applicant: SAFRAN AIRCRAFT ENGINES, Paris (FR)

(72) Inventors: Charles-Henri Claude Jacky Sullet, Moissy-cramayel (FR); Guillaume Pascal Jean-Charles Gondre, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/248,711

(22) PCT Filed: Oct. 5, 2021

(86) PCT No.: PCT/FR2021/051726
§ 371 (c)(1),
(2) Date: Apr. 12, 2023

(87) PCT Pub. No.: WO2022/079370
PCT Pub. Date: Apr. 21, 2022

(65) Prior Publication Data
US 2023/0392507 A1  Dec. 7, 2023

(30) Foreign Application Priority Data

Oct. 12, 2020 (FR) ...................................... 2010395

(51) Int. Cl.
*F01D 5/28* (2006.01)

(52) U.S. Cl.
CPC .......... *F01D 5/282* (2013.01); *F05D 2220/36* (2013.01); *F05D 2240/303* (2013.01); *F05D 2300/603* (2013.01)

(58) Field of Classification Search
CPC ................. F01D 5/282; F05D 2220/36; F05D 2240/303; F05D 2300/603
See application file for complete search history.

(56) References Cited

U.S. PATENT DOCUMENTS

| | | | |
|---|---|---|---|
| 2011/0211965 A1* | 9/2011 | Deal | ......................... F02K 3/04 416/223 R |
| 2012/0301292 A1* | 11/2012 | Deal | ....................... F01D 5/147 416/224 |

(Continued)

FOREIGN PATENT DOCUMENTS

| | | |
|---|---|---|
| FR | 2906320 A1 | 3/2008 |
| FR | 3045712 A1 | 6/2017 |

(Continued)

OTHER PUBLICATIONS

French Search Report issued in French Application No. 20 10395 on Jun. 7, 2021 (2 pages).

(Continued)

*Primary Examiner* — Aaron R Eastman
(74) *Attorney, Agent, or Firm* — Bookoff McAndrews, PLLC

(57) ABSTRACT

A blade comprising a blade body made of fiber-reinforced organic-matrix composite material and a leading edge shield made of a material having a better resistance to point impacts than the composite material of the blade body, the leading edge shield being assembled on the blade body and including a pressure side fin and a suction side fin connected by a thicker central part, the blade including an aerodynamic airfoil height and a chord length, the suction side fin having a first length projected onto the chord between 10 and 18% of the chord length, the first length being disposed between 70 and 80% of the aerodynamic airfoil height, a second length projected onto the chord between 18 and 26% of the (Continued)

chord length, the second length being disposed between 85 and 95% of the aerodynamic airfoil height.

9 Claims, 4 Drawing Sheets

(56) References Cited

U.S. PATENT DOCUMENTS

| | | | | |
|---|---|---|---|---|
| 2013/0111908 | A1* | 5/2013 | Murooka | F01D 5/28 60/726 |
| 2013/0236323 | A1* | 9/2013 | Mironets | C23C 24/04 29/889 |
| 2015/0218953 | A1* | 8/2015 | Bottome | F01D 5/147 416/224 |
| 2016/0177744 | A1* | 6/2016 | Benson | F01D 5/147 29/889.71 |
| 2016/0177779 | A1* | 6/2016 | Benson | F04D 29/324 416/2 |
| 2016/0230774 | A1* | 8/2016 | Whitehurst | B23P 15/04 |
| 2017/0081752 | A1* | 3/2017 | Hanley | B29C 64/153 |
| 2017/0268349 | A1* | 9/2017 | Bryant, Jr. | F01D 5/147 |
| 2018/0119551 | A1* | 5/2018 | Romero | F01D 5/282 |
| 2018/0163744 | A1* | 6/2018 | Mironets | B23P 15/04 |
| 2022/0381148 | A1* | 12/2022 | Gondre | F04D 29/023 |
| 2023/0088650 | A1* | 3/2023 | Gondre | F04D 29/324 416/230 |
| 2023/0129130 | A1* | 4/2023 | Gondre | F01D 21/045 416/229 A |

FOREIGN PATENT DOCUMENTS

| | | |
|---|---|---|
| FR | 3045713 A1 | 6/2017 |
| GB | 1500776 A | 2/1978 |

OTHER PUBLICATIONS

Interational Search Report and Written Opinion issued in International Application PCT/FR2021/051726 on Jan. 14. 2023 (11 pages).

* cited by examiner

[Fig. 1]
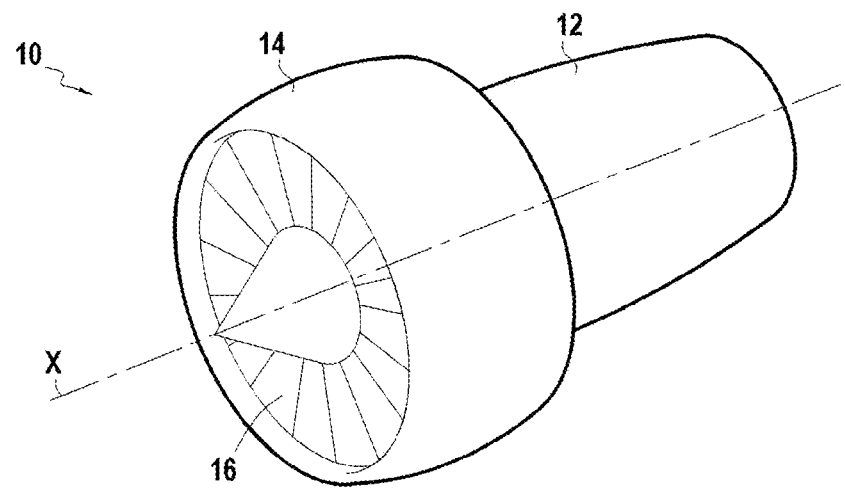
[Fig. 2]
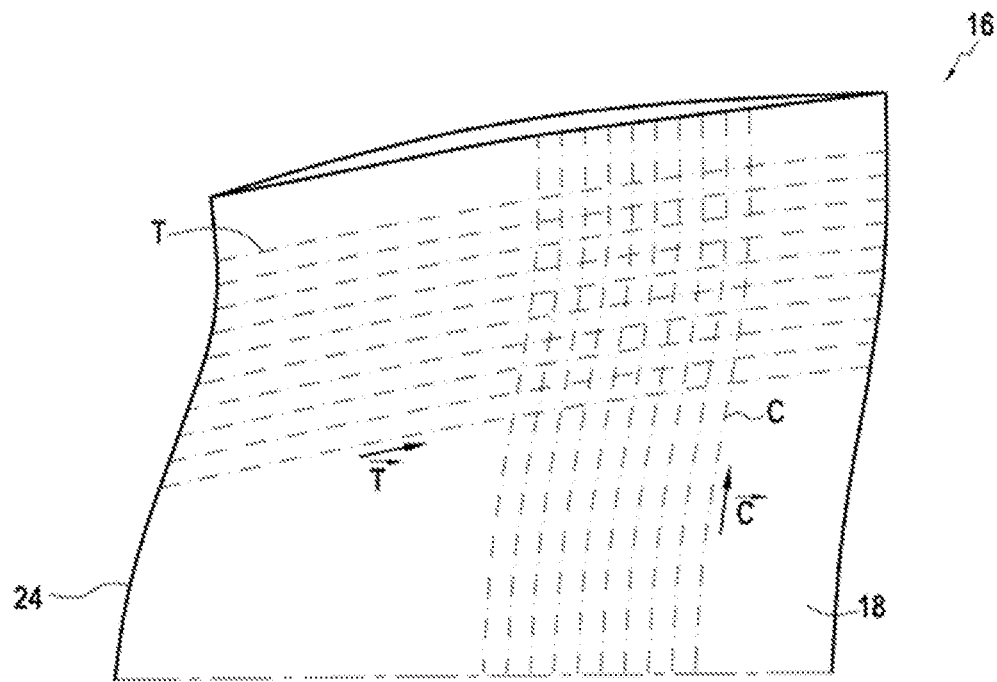

[Fig. 3]
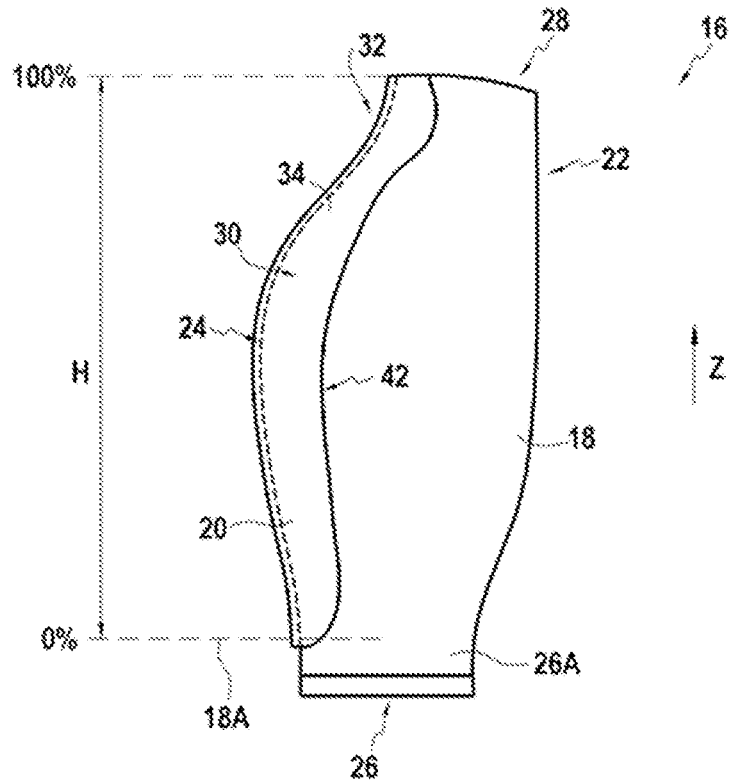
[Fig. 4]
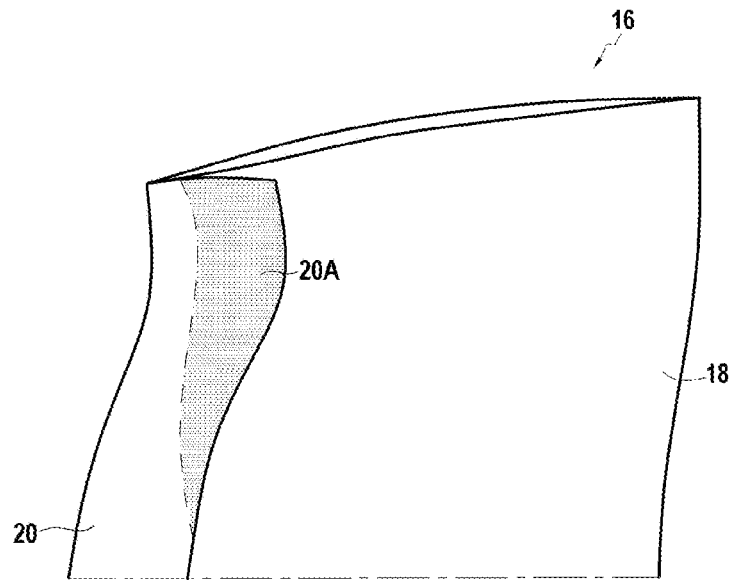
Prior Art

[Fig. 5]
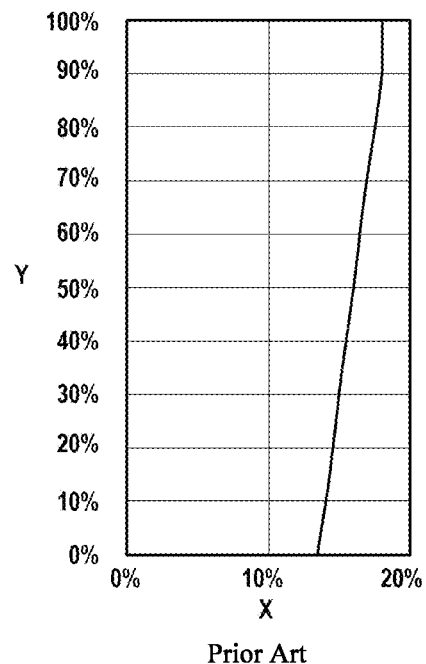
Prior Art
[Fig. 6]
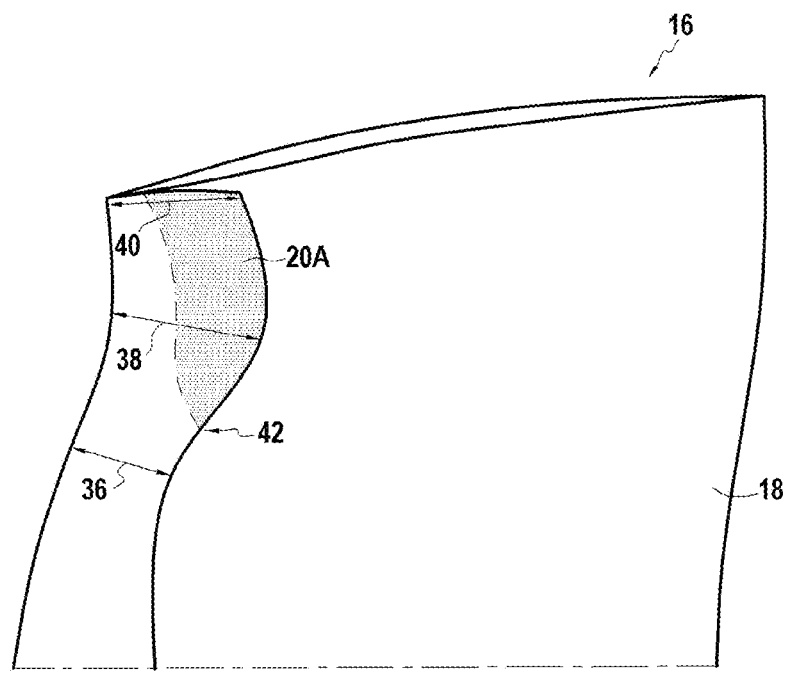

[Fig. 7]
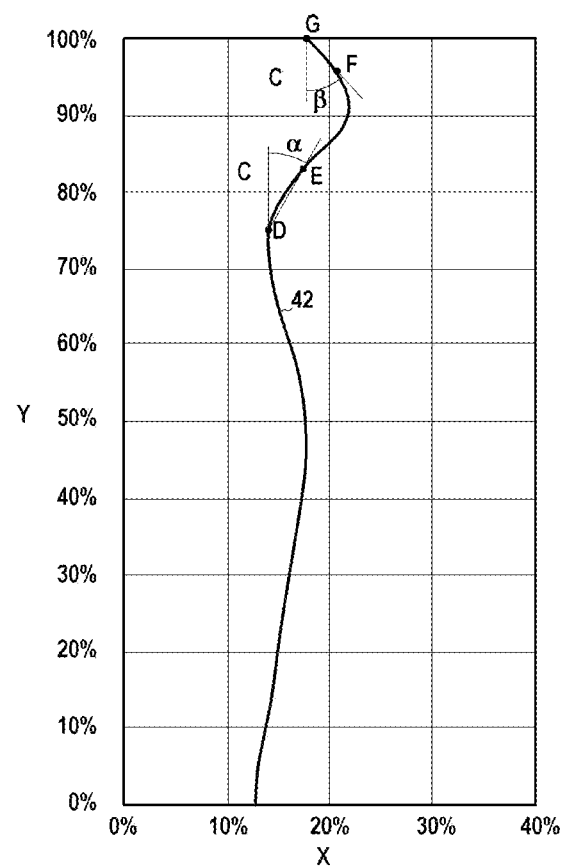

BLADE MADE OF COMPOSITE MATERIAL COMPRISING A LEADING EDGE SHIELD, TURBINE ENGINE COMPRISING THE BLADE

CROSS-REFERENCE TO RELATED APPLICATIONS

This is a National Stage Application under 35 U.S.C. § 371 of International Application No. PCT/FR2021/051726, filed Oct. 5, 2021, now published as WO 2022/079370 A1, which claims priority to French Patent Application No. 2010395, filed on Oct. 12, 2020.

TECHNICAL FIELD

The present disclosure relates to a leading edge shield for a turbomachine blade, in particular a leading edge shield of a blade made of composite material.

PRIOR ART

Such leading edge shields are typically intended to protect the leading edges of rotary blades or guide vanes from impacts and erosion. The term "blades", in this context, refers to both fan blades and aircraft propeller blades. To limit their weight, these blades are typically made of organic-matrix composite, for example made of fiber-reinforced polymer. Although these materials have generally very favorable mechanical qualities, in particular with regard to their weight, they have a certain sensitivity to point impacts. Shields, typically made of highly resistant metallic material, such as titanium alloys, are therefore normally installed on the leading edges of such blades, to protect them from these impacts. These impacts may be the consequence of the ingestion of small birds into the engine, for example. These shields normally take the form of a thin pressure side fin and a thin suction side fin jointed by a thicker section straddling the leading edge, the whole fitting the shape of the blade on the leading edge and of the adjacent sections of the pressure side and the suction side. The pressure and suction side fins extend over these sections of the pressure side and the suction side of the blade respectively, and mainly serve to ensure the positioning and attachment of the shield on the leading edge.

From FR2906320 a leading edge shield is known, making it possible to reduce damage to the composite-material blade in the event of impact of a foreign object.

To improve the aerodynamic performance of the blades, their leading edges have more and more complex shapes, which complicates the manufacturing of the shields that have to fit these shapes and also the securing of the shield onto the blade.

Moreover, in the event of impacts on a blade, for example the ingestion of a bird, the shield may become at least partly detached from the leading edge of the composite blade and generate an alteration of the aerodynamic performance related to the degradation of the aerodynamics of the blade which may be significant.

Furthermore, if a portion of shield is torn out, the leading edge of the blade is no longer protected over its entire height, the composite on the exposed leading edge of the blade is subject to aggressions from the outside environment. The resulting profile is generally uneven which also leads to a loss of aerodynamics.

In addition to the partial detachment of the shield at the blade tip, damage to the blade, also known as the "hinge effect", may be seen. This damage is also due to the forces exerted by the fins on the blade during rotational movements of the shield with respect to the blade.

Following this damage, it is generally necessary to repair the blade and/or replace it.

SUMMARY OF THE INVENTION

The present disclosure aims to at least partly remedy these drawbacks.

For this purpose, the present disclosure relates to a blade including a blade body made of fiber-reinforced organic-matrix composite material and a leading edge shield made of a material having a better resistance to point impacts than the composite material of the blade body, the leading edge shield being assembled on the blade body and including a pressure side fin and a suction side fin connected by a thicker central part, the blade including an aerodynamic airfoil height and a chord length, the suction side fin having:
- a first length projected onto the chord between 10 and 18% of the chord length, the first length being disposed between 70 and 80% of the aerodynamic airfoil height,
- a second length projected onto the chord between 18 and 26% of the chord length, the second length being disposed between 85 and 95% of the aerodynamic airfoil height, and
- a third length projected onto the chord between the first length and the second length, the third length being disposed at 100% of the aerodynamic airfoil height.

Owing to this geometry of the leading edge shield, it is possible to reduce the detachment of the suction side fin during point impacts, such as the ingestion of small birds into the engine. In particular, the first length makes it possible to reduce the extent of the detachment of the suction side fin at the blade tip, the second length allowing the fin to exert its protective effect in an area generally heavily stressed during bird ingestion, the blade body being relatively thick in this area. The third length is a trade-off between the first length and the second length. Thus, even during a partial detachment of the suction side fin, the degradation of the aerodynamics of the blade 16 is reduced by comparison with a blade of the prior art. It is also possible by making it possible to optimize detachment degradation, to reduce the risks of degradation of the casing.

In some embodiments, the first length may be equal to 14% of the chord length.

In some embodiments, the second length may be equal to 22% of the chord length.

In some embodiments, the first length may be disposed at 75% of the aerodynamic airfoil height.

In some embodiments, the second length may be disposed at 90% of the aerodynamic airfoil height.

In some embodiments, the blade body may include a warp thread and a weft thread and the suction side fin may include a free edge, a first point disposed on the free edge at the same height as the first length and a second point disposed on the free edge at a height greater than or equal to 5% of the aerodynamic airfoil height with respect to the height of the first length and less than or equal to 85% of the aerodynamic airfoil height define a first vector, the first vector and the warp direction at the first point defining a first angle, the first angle being greater than or equal to 15°.

When the first angle is greater than or equal to 15°, the free edge of the shield crosses several warp strands of the blade body, this plurality of strands being stressed during impacts on the blade.

In some embodiments, the blade body may include a warp direction and a weft direction and the suction side fin may include a free edge, a third point disposed on the free edge at 100% of the aerodynamic airfoil height and a fourth point disposed on the free edge at a height greater than the height of the second length and less than or equal to 95% of the aerodynamic airfoil height define a second vector, the second vector and the warp direction at the third point defining a second angle, the second angle being greater than or equal to 15°.

When the second angle is greater than or equal to 15°, the free edge of the shield crosses several wrap strands of the blade body, this plurality of strands being stressed during impacts on the blade.

In some embodiments, the blade body may include a warp direction and a weft direction and the suction side fin may include a free edge, a first point disposed on the free edge at the same height as the first length and a second point disposed on the free edge at a height greater than or equal to 5% of the aerodynamic airfoil height with respect to the height of the first length and less than or equal to 85% of the aerodynamic airfoil height define a first vector, the first vector and the warp direction at the first point defining a first angle, the first angle being greater than or equal to 15° and a third point disposed on the free edge at 100% of the aerodynamic airfoil height and a fourth point disposed on the free edge at a height greater than the height of the second length and less than or equal to 95% of the aerodynamic airfoil height define a second vector, the second vector and the warp direction at the third point defining a second angle, the second angle being greater than or equal to 15°.

The present disclosure also relates to a turbomachine including a blade as previously defined.

BRIEF DESCRIPTION OF THE DRAWINGS

Other features and advantages of the subject of the present disclosure will become apparent from the following description of embodiments, given by way of non-limiting example, with reference to the appended figures.

FIG. 1 is a schematic perspective view of a bypass turbomachine.

FIG. 2 is a partial schematic perspective view of a rotary blade of the fan of the turbojet engine of FIG. 1 showing the weft strands and the warp strands according to an embodiment of the blade.

FIG. 3 is a schematic perspective view of a rotary blade of the fan of the turbojet engine of FIG. 1 according to an embodiment of the blade.

FIG. 4 is a partial schematic perspective view of a blade of the prior art.

FIG. 5 is a graph representing the length of the leading edge of the shield of FIG. 4.

FIG. 6 is a partial schematic perspective view of the blade of FIG. 3.

FIG. 7 is a graph representing the length of the leading edge of the shield of FIG. 6.

In all the figures, common elements are marked by identical reference numbers.

DETAILED DESCRIPTION

FIG. 1 illustrates a bypass turbojet engine 10, which is a non-limiting example of a turbomachine, comprising a gas generator unit 12 and a fan 14. This fan 14 comprises a plurality of rotary blades 16, radially disposed around a central axis X, and aerodynamically profiled in such a way as to impel air by their rotation.

Thus, as illustrated in FIG. 3, each blade 16 comprises a blade body 18 which has a leading edge 24 (in dotted lines in FIG. 3), a trailing edge 22, a blade root 26 and a blade tip 28. Between the blade root 26 and the end of the blade tip 28, the blade 16 conventionally comprises an airfoil which is aerodynamically profiled in such a way as to impel the air with which it is in direct contact in the air flow path. The "height" on the blade and in particular on its airfoil will be considered along the axis of stacking Z that the leading edge 24, in particular, follows.

Under normal operation, the relative wind is substantially oriented toward the leading edge 24 of each blade. Thus, this leading edge 24 is particularly exposed to impacts. In particular when the blade body 18 is made of composite material, in particular fiber-reinforced polymer matrix material, it is advisable to protect the leading edge 24 with a leading edge shield 20 integrated into each blade. In the embodiment of FIG. 3, the shield 20 has a pressure side fin 32, a suction side fin 30 and a thicker central section 34 intended to straddle the leading edge 24 of the blade body 18 and connecting the suction side fin 32 and the pressure side fin 30. The pressure and suction side fins 32, 30 provide the positioning of the shield 20 on the blade body 18. The thicker central section 34 is also known as the nose of the leading edge shield 20.

The shield 20 also includes a radially inward end disposed on the side of the blade root 26 and a radially outward end disposed at the blade tip 28.

Opposite the nose 34, the pressure side and suction side fins 32, 30 each include a free edge 42.

The leading edge shield 20 is made of a material having a stiffness greater than that of the composite material of the blade body, The leading edge shield 20 is made of a material having better resistance to point impacts than the composite material of the blade body. The leading-edge shield 20 is mainly metallic, and more specifically made of titanium-based alloy, such as for example TA6V (Ti-6A1-4V). The leading-edge shield 20 could also be made of steel or iron, chrome and nickel alloys commonly referred to by the brand name Inconel™. In the remainder of this text the term Inconel will be used to refer to such an iron-, chrome- and nickel-based alloy.

FIG. 3 also shows the aerodynamic airfoil height H of the blade 16. The 0% being disposed on the side of the blade root 26 and the 100% being disposed at the blade tip 28. The airfoil is conventionally connected to the blade root 26 by a shank 26A.

FIG. 2 shows the direction T of the weft strands and the direction C of the warp strands of the blade body 16. The vector r and the vector e respectively representing the weft direction and the warp direction.

FIGS. 4 and 5 show a blade of the prior art. As shown in FIG. 4, in the event of impacts on the blade 16, a portion 20A of the shield 20 may become detached from the blade body 18. This portion 20A may cause a degradation of the aerodynamics of the blade 16 which may reach the vicinity of 25% of thrust loss. As shown in FIG. 5, the length of the suction side fin is shown on the X axis and the aerodynamic airfoil height is shown on the Y axis. FIG. 5 therefore shows the variation in the length of the suction side fin along the aerodynamic airfoil height. The height H of the aerodynamic airfoil is expressed as a % and the length of the fin is expressed as a % of the chord at a given aerodynamic airfoil height. Thus, the airfoil has an airfoil height H along the stacking axis Z between its lower boundary, at the intersection with the shank 26A and its end of the blade tip 28. The predetermined aerodynamic airfoil height H is considered with reference to a lower boundary 18A of the airfoil which is also the upper boundary of the shank 26A.

The chord is an imaginary line going from the leading edge 24 to the trailing edge 22 of the blade 16. The fin length is measured by projection of the fin onto the chord.

FIGS. 6 and 7 are similar figures to FIGS. 4 and 5.

FIG. 6 shows an embodiment of the blade 16 and FIG. 7 shows the variation in the length of the suction side fin 30 along the aerodynamic airfoil. The height of the aerodynamic airfoil is expressed as a % and the length of the fin is expressed as a % of the chord at a given aerodynamic airfoil height.

By way of non-limiting example, the first length is equal to 14% of the chord length and is disposed at 75% of the aerodynamic airfoil height, the second length is equal to 22% of the chord length and is disposed at 90% of the aerodynamic airfoil height and the third length is equal to 18% of the chord length.

In the example of FIG. 7, the first point D is on the free edge 42 of the shield 20, at 75% of the aerodynamic airfoil height.

In addition, the second point E is disposed on the free edge 42 and may be disposed between 80% and 85% of the aerodynamic airfoil height, 80% of the aerodynamic airfoil height being equal to the height of the first length 36 with an added 5% of the aerodynamic airfoil height.

By way of non-limiting example, the second point E is disposed at 81% of the aerodynamic airfoil height.

The first point D and the second point E define the first vector.

The warp direction C and the first vector form a first angle α that is greater than or equal to 15°.

The third point G is disposed on the free edge 42 and at 100% of the aerodynamic airfoil height.

By way of non-limiting example, the second length 38 being at 90% of the aerodynamic airfoil height, the fourth point F is disposed on the free edge 42 and may be disposed between 90% and 95% of the aerodynamic airfoil height.

By way of non-limiting example, the fourth point F is disposed on the free edge at 95% of the aerodynamic airfoil height.

The third point G and the fourth point F define the second vector.

The warp direction C and the second vector form a second angle β that is greater than or equal to 15°.

As shown in FIGS. 4 and 6, it can be seen that the portion 20A of the shield 20 that may become detached from the blade body 18 is reduced in the case of FIG. 6 by comparison with FIG. 4. Hence, during a partial detachment of the suction side skin, the degradation of the aerodynamics of the blade 16 is reduced by comparison with a blade of the prior art.

Although the present disclosure has been described with reference to a specific exemplary embodiment, it is obvious that the various modifications and changes may be made to these examples without departing from the general scope of the invention as defined by the claims. Furthermore, the individual features of the different embodiments described may be combined in additional embodiments. Consequently, the description and drawings must be considered in an illustrative, rather than a restrictive sense.

The invention claimed is:

1. A blade comprising a blade body made of fiber-reinforced organic-matrix composite material and a leading edge shield having a better resistance to point impacts than the composite material of the blade body, the leading edge shield being assembled on the blade body and including a pressure side fin and a suction side fin connected by a thicker central part, the blade including an aerodynamic airfoil height and a chord length, the suction side fin having:
    a first length projected onto the chord between 10 and 18% of the chord length, the first length being disposed between 70 and 80% of the aerodynamic airfoil height,
    a second length projected onto the chord between 18 and 26% of the chord length, the second length being disposed between 85 and 95% of the aerodynamic airfoil height, and
    a third length projected onto the chord between the first length and the second length, the third length being disposed at 100% of the aerodynamic airfoil height.

2. The blade according to claim 1, wherein the first length is equal to 14% of the chord length.

3. The blade according to claim 1, wherein the second length is equal to 22% of the chord length.

4. The blade according to claim 1, wherein the first length is disposed at 75% of the aerodynamic airfoil height.

5. The blade according to claim 1, wherein the second length is disposed at 90% of the aerodynamic airfoil height.

6. The blade according to claim 1, wherein the blade body comprises a warp direction and a weft direction and the suction side fin comprises a free edge, a first point disposed on the free edge at the same height as the first length and a second point disposed on the free edge at a height at least 5% greater than the height of the first length and less than or equal to 85% of the aerodynamic airfoil height, the first point and second point defining a first vector, the first vector and the warp direction at the first point defining a first angle, the first angle being greater than or equal to 15°.

7. The blade according to claim 1, wherein the blade body comprises a warp direction and a weft direction and the suction side fin comprises a free edge, a third point disposed on the free edge at 100% of the aerodynamic airfoil height and a fourth point disposed on the free edge at a height greater than the height of the second length and less than or equal to 95% of the aerodynamic airfoil height define a second vector, the second vector and the warp direction at the third point defining a second angle, the second angle being greater than or equal to 15°.

8. The blade according to claim 1, wherein the blade body comprises a warp direction and a weft direction and the suction side fin comprises a free edge, a first point disposed on the free edge at the same height as the first length and a second point disposed on the free edge at a height at least 5% greater than the height of the first length and less than or equal to 85% of the aerodynamic airfoil height, the first point and second point defining a first vector, the first vector and the warp direction at the first point defining a first angle, the first angle being greater than or equal to 15° and a third point disposed on the free edge at 100% of the aerodynamic airfoil height and a fourth point disposed on the free edge at a height greater than the height of the second length and less than or equal to 95% of the aerodynamic airfoil height define a second vector, the second vector and the warp direction at the third point defining a second angle, the second angle being greater than or equal to 15°.

9. A turbomachine comprising a blade according to claim 1.

* * * * *